United States Patent
Kobayashi

[11] Patent Number: 5,816,378
[45] Date of Patent: Oct. 6, 1998

[54] CLAW CLUTCH WITH A POSITIONING MECHANISM

[75] Inventor: Tsuyoshi Kobayashi, Anjo, Japan

[73] Assignee: Makita Corporation, Aichi-pref., Japan

[21] Appl. No.: 764,614

[22] Filed: Dec. 11, 1996

[30]  Foreign Application Priority Data

Dec. 14, 1995  [JP]  Japan ..................... 7-326026

[51] Int. Cl.⁶ ............. F16D 11/14; F16D 23/02
[52] U.S. Cl. ........................... 192/69.8; 192/108
[58] Field of Search ............ 192/69, 69.7, 69.8, 192/69.81, 69.82, 69.83, 108

[56]  References Cited

U.S. PATENT DOCUMENTS

| 2,150,468 | 3/1939 | Thomson | 192/53 |
|---|---|---|---|
| 2,667,252 | 1/1954 | Meyer | 192/108 X |
| 3,249,377 | 5/1966 | Weasler | 287/103 |
| 3,709,343 | 1/1973 | Sigg | 192/108 X |

FOREIGN PATENT DOCUMENTS

| 2 20 280 | 1/1908 | Germany . |
|---|---|---|
| 10 12 782 | 7/1957 | Germany . |
| 1 806 131 | 12/1971 | Germany . |
| 692 06 879 T2 | 11/1992 | Germany . |
| 53-81756 | 12/1951 | Japan . |
| 666 098 A5 | 6/1988 | Switzerland . |

OTHER PUBLICATIONS

German article entitled "Die Maybach–Abweis–Klauenkupplung im Zuge der Entwicklung mechanischer Schaltgetriebe grosser Leistung", *MTZ Jahrig*, vol. 20, pp. 275–282 (Jul. 7, 1959).

*Primary Examiner*—Richard M. Lorence
*Attorney, Agent, or Firm*—Lahive & Cockfield, LLP

[57]  ABSTRACT

A clutch cam (9) with mating claws (17) is fitted into the bottom end of a driven pulley (6) through which a driven shaft (10) is inserted. The clutch cam (9) has upwardly tapered guide portions (18) and slide grooves (20) formed on the inner wall thereof. A cam sleeve (12) is fitted over an upper portion of the driven shaft (10) and rotated integrally with the driven shaft (10) due to a key (11). Clutch claws (16) are formed at the lower end of the cam sleeve (12). The key (11) has a tapered bottom end (11a). When the driven shaft (10) is lowered to the clutch cam (9), the tapered bottom end (11a) is brought into contact with one of the guide portions (18) into one of the slide grooves (20), placing the clutch claws (16) in a proper position relative to the mating claws (17) for smooth clutch engagement.

10 Claims, 9 Drawing Sheets

5,816,378

CLAW CLUTCH WITH A POSITIONING MECHANISM

BACKGROUND OF THE INVENTION

1. Field of the Invention

The present invention relates to a claw clutch provided between a driving shaft and a driven shaft disposed coaxially with each other for transmitting torque from the driving shaft to the driven shaft.

2. Description of the Prior Art

A typical conventional claw clutch comprises coaxially disposed driving and driven shafts, and two sets of mating claws provided on the opposing ends of the two shafts. The two sets of mating claws are brought into engagement with each other for transmitting the torque of the driving shaft to the driven shaft by moving one of the two shafts to the other.

In the conventional claw clutch, however, the two sets of claws on the shafts, which are not rotated until contacting each other, may not necessarily be in proper positions for smooth engagement when being brought together. If not properly positioned, the mating claws on the shafts clash with each other. When the driving shaft is rotated, the two sets of claws continues to clash until engagement, making unpleasant noises and causing rapid wear.

SUMMARY OF THE INVENTION

In view of the above-identified problems, an object of the present invention is to provide an improved claw clutch which allows the opposing sets of claws to engage with each other smoothly without clashing.

Another object of the present invention is to provide an improved claw clutch with a much lower wear rate.

The above and other related objects are attained by the invention, which provides a claw clutch for transmitting torque from a driving shaft to a driven shaft coaxial with the driving shaft by moving one of the shafts to the other for smooth clutch engagement. The claw clutch comprises a plurality of first claws formed on one end of the driving shaft, a plurality of second claws formed on the end of the driven shaft opposing the first claws of the driving shaft, and a positioning means for rotating one of the shafts so as to guide the rotated shaft to a position where the first claws engage with the second claws without clashing when one of the driving or driven shafts is moved to the other shaft for clutch engagement.

This positioning means can include at least one protrusion formed on one of the driving or driven shafts and at least one recess formed on the other shaft, each of the at least one recess having a pair of guide portions for guiding the at least one protrusion into the at least one recess when one of the driving or driven shafts is moved to the other for clutch engagement.

Preferably, the at least one protrusion is tapered off toward the shaft on which the at least one protrusion is not formed.

In accordance with the invention, each of the guide portions may include a slope extended obliquely to the axial direction of the shafts.

In carrying out the invention in one preferred mode, a claw clutch is provided for transmitting torque from a driving shaft to a coaxial driven shaft by moving one of the shafts to the other for smooth clutch engagement. The claw clutch comprises a first coupler provided on one end of the driving shaft, a second coupler provided on the end of the driven shaft opposing the first coupler formed on the driving shaft, a plurality of first claws formed on the first coupler, and a plurality of second claws formed on the second coupler. The claw clutch further comprises a coaxial bar provided on one of the two couplers, the coaxial bar having at least one protrusion formed thereon, a bore formed in the coupler on which the coaxial bar is not provided, for receiving the coaxial bar, and at least one recess formed in the inner peripheral wall of the bore, the at least one recess each including a pair of guide slopes. When, in operation, one of the driving or driven shafts is moved to the other for clutch engagement, the at least one protrusion formed on the coaxial bar comes into contact with one of the guide slopes and is rotatably guided to a position where the first claws engage with the second claws without clashing.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

Figure 1:
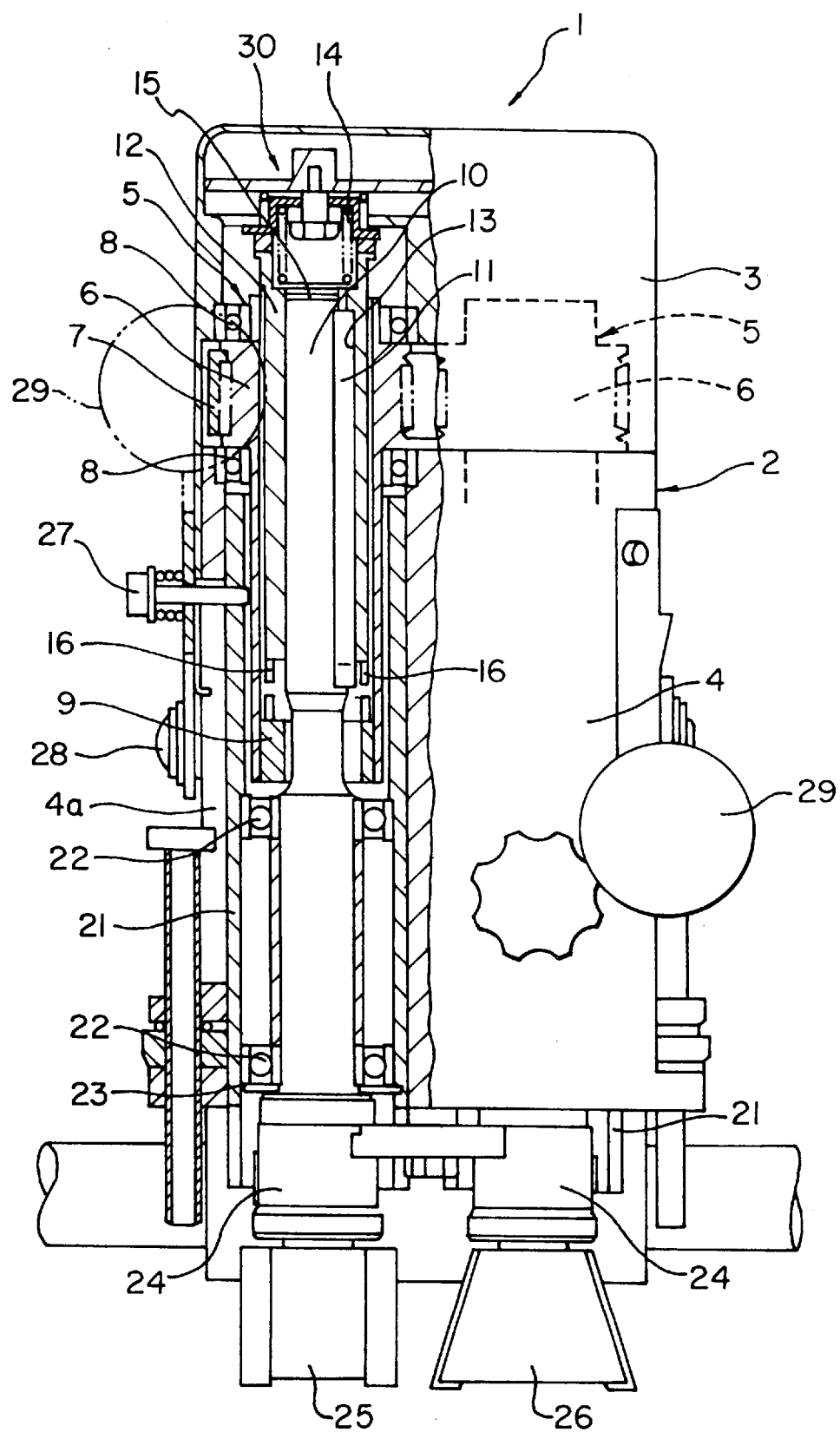
FIG. 1 is a partial cross sectional view of a housed joint machine in accordance with the present invention.
Figure 2:
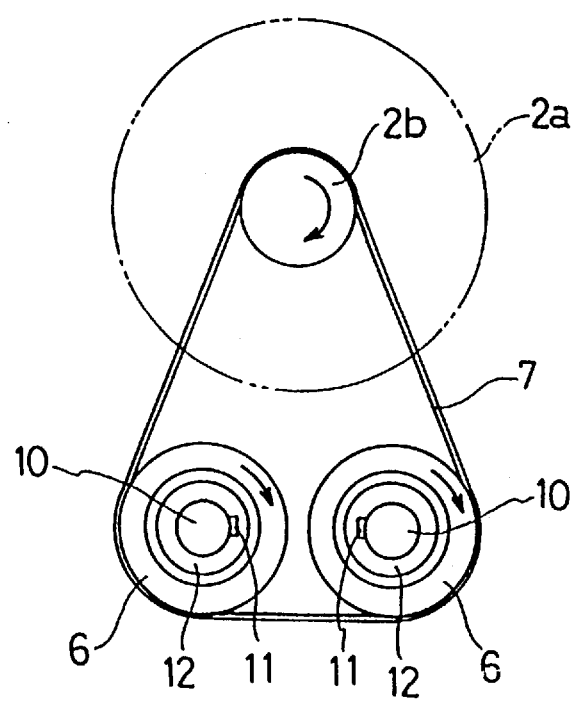
FIG. 2 is a plan view of a mechanism for transmitting the rotation of a motor of the housed joint machine shown in FIG. 1.

FIG. 1 is a partial cross section of a housed joint machine 1 in accordance with the present invention. Reference numeral 2 designates a main body of the housed joint machine 1 mounted on a support structure (not shown). The main body 2 is freely movable in first and second orthogonal directions on a horizontal plane and includes a top cover 3 mounted on top of housing 4. A motor 2a (see FIG. 2) is vertically disposed in the rear center of the main body 2 in the housing 4. Also provided is a pair of bit rotation mechanisms 5 each with a driven pulley 6 fitted around the top portion thereof. As shown in FIG. 2, a driving pulley 2b is directly attached to the motor shaft (not shown) and a belt 7 is fitted around the driving pulley 2b and the two driven pulleys 6. As the motor 2a is operated, its rotation is transmitted to the driven pulleys 6 via the belt 7, thereby simultaneously rotating the pulleys 6.

The following explanation of the bit rotation mechanisms 5 refers to the left mechanism since both mechanisms are symmetrical. The driven pulley 6 is a cylinder supported by ball bearings 8. The driven pulley 6 has in its upper part a portion for fitting the belt 7 therearound while a clutch cam 9 is tightly fitted in the opposite, bottom end thereof. The clutch cam 9, which will be described in greater detail, transmits the rotation of the motor 2a to the attached bit. A driven shaft 10 which serves as a spindle and a cam sleeve 12 are also movably and coaxially inserted into the inner bore of the driven pulley 6. A key 11 is secured to the upper section of the driven shaft 10 in the axial direction. Also, the key 11 is fitted into a key groove 13 provided in the axial direction in the inner wall of the cam sleeve 12, so that the driven shaft 10 is integrally rotatable with, and vertically slidable relative to, the cam sleeve 12. Meanwhile, the cam sleeve 12 is pressed downward by a compression spring 14 of a brake mechanism 30 provided over the bit rotation mechanism 5 near the top of the cover 3. A C-ring 15 is fitted in the upper end of the bore of the cam sleeve 12 for preventing the driven shaft 10 from protruding upward from the cam sleeve 12. Also, the cam sleeve 12 has three clutch claws 16 projected from the bottom end thereof. The clutch claws 16 and the clutch cam 9, when engaged, constitute a claw clutch for transmitting the rotation of the driven pulley 6 to the driven shaft 10 via the cam sleeve 12.

The lower part of the driven shaft 10 is contained in a cylindrical sleeve 21 and supported by a pair of ball bearings 22 and a check ring 23 so as to be rotatable and vertically slidable. A straight bit 25 (on the left in FIG. 1) for forming a square groove and a dovetail bit 26 (on the right in FIG. 1) for forming a dovetail groove are detachably connected to left and right holders 24, respectively. A connecting bolt 27 is secured to the sleeve 21 through a hole 4a formed in the housing 4. The connecting bolt 27 also penetrates the middle portion of a lever 29 which is supported alongside the housing 4 by a pivot pin 28 on one end. By pulling down or pushing up the lever 29, the sleeve 21, the driven shaft 10, and thus the attached bit 25 (the bit 26 if the right handle 29 is operated) can be integrally lowered out of, or raised into, the housing 4 via the bolt 27.

Figure 3:
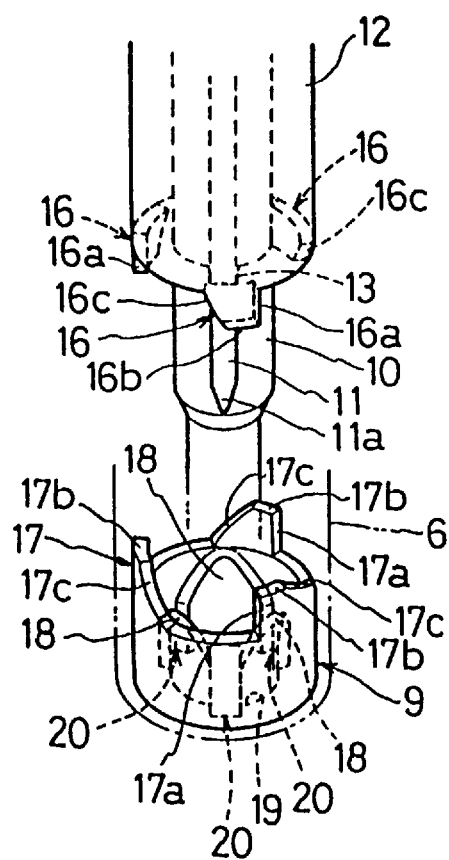
FIG. 3 is a perspective view of a claw clutch of the housed joint machine shown in FIG. 1.
Figure 4A:
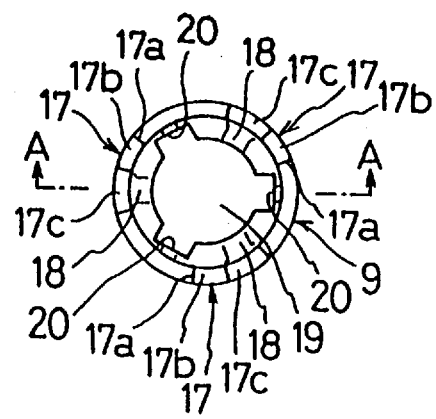
FIG. 4A is a plan view of the clutch cam shown in FIG. 3.
Figure 4B:
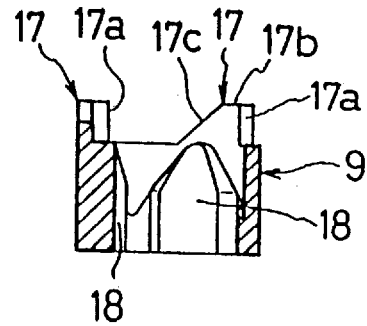
FIG. 4B is a vertical cross sectional view of the clutch cam taken on line A—A of FIG. 4A.
Figure 4C:
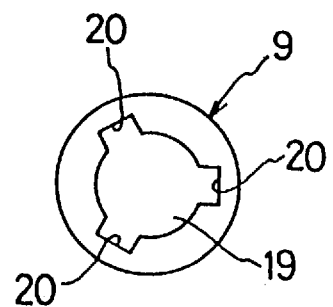
FIG. 4C is a bottom view of the clutch cam shown in FIG. 3.

Turning now to FIGS. 3, 4A, 4B, and 4C, the claw clutch, composed of the clutch cam 9 of the driven pulley 6 and the cam sleeve 12, is explained in detail hereinafter. FIG. 3 is a perspective view of the claw clutch. FIGS. 4A, 4B, and 4C show a plan view, a vertical cross sectional view, and a bottom view of the clutch cam 9, respectively. The clutch cam 9 has an annular shape with three mating claws 17 formed at regular intervals (every 120 degrees) around the top end thereof. The clutch cam 9 also has three guide portions 18 formed at regular intervals (every 120 degrees) on the inner wall thereof. The guide portions 18 are defined by a through-hole 19 which is penetrated by the driven shaft 10, and three slide grooves 20 for receiving the key 11. Also, each of the guide portions 18 is tapered toward the top end of the clutch cam 9. On the other hand, each of the mating claws 17 is a trapezoidal protrusion defined by a vertical face 17a extended parallel to the axial direction, a circumferencial top surface 17b connected to the vertical face 17a, and a slope 17c connected to the top surface 17b.

The cam sleeve 12 also has, as previously described, three clutch claws 16 formed at regular intervals (every 120 degrees) on the outer edge of the bottom end thereof, with one of the claws 16 radially aligned with the key groove 13. As is the same with the mating claw 17, each clutch claw 16 is a trapezoidal protrusion defined by an vertical face 16a extended parallel to the axial direction, a circumferencial bottom surface 16b connected to the vertical face 16a, and a slope 16c connected to the bottom surface 16b.

The key 11, which is secured to the driven shaft 10, has a tapered bottom end 11a. When lowered, the tapered bottom end 11a is brought into contact with, and guided by, one of the guide portions 18, so that the key 11 smoothly slides into one of the slide grooves 20. When the key 11 is fitted in any one of the slide grooves 20, the vertical faces 17a of the mating claws 17 engage with the vertical faces 16a of the clutch claws 16 as shown in FIG. 3.

Figure 5:
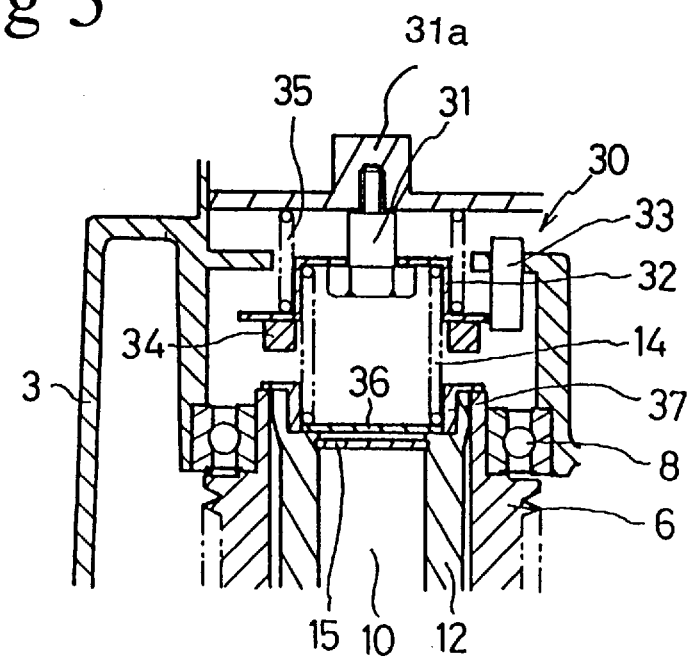
FIG. 5 is a partial cross sectional view of a brake mechanism of the housed joint machine shown in FIG. 1 when the brake mechanism is not actuated.
Figure 6:
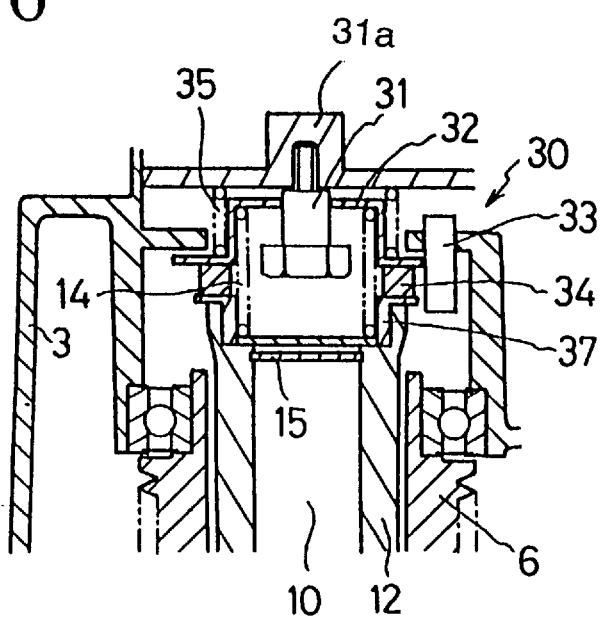
FIG. 6 is a partial cross sectional view of the brake mechanism shown in FIG. 5 when the brake mechanism is actuated.

The brake mechanism 30 is explained hereinafter with specific reference to FIGS. 5 and 6. The upper portion of the compression spring 14 is fitted in a rimmed brake holder 32 which is secured by a bolt 31 to an upper plate 31a and prohibited from rotating by a pin 33. An annular brake shoe 34 is attached to the underside of the rim of the brake holder 32. Also, another compression spring 35 is mounted between the upper plate 31a and the brake holder 32 to press down the brake holder 32 into contact with the head of the bolt 31. Reference numeral 36 designates a washer on which the lower end of the compression spring 14 abuts while numeral 37 is a holder fitted in the upper end of the cam sleeve 12. With the brake mechanism 30 thus constructed, when the sleeve 21 and the driven shaft 10 are raised by operating the lever 29, the driven shaft 10 comes into contact with the C-ring 15 and also raises the cam sleeve 12 against the downward pressure of the compression spring 14. As a result, the cam sleeve 12 abuts against the brake shoe 34 via the holder 37 as shown in FIG. 6.

Figure 7A:
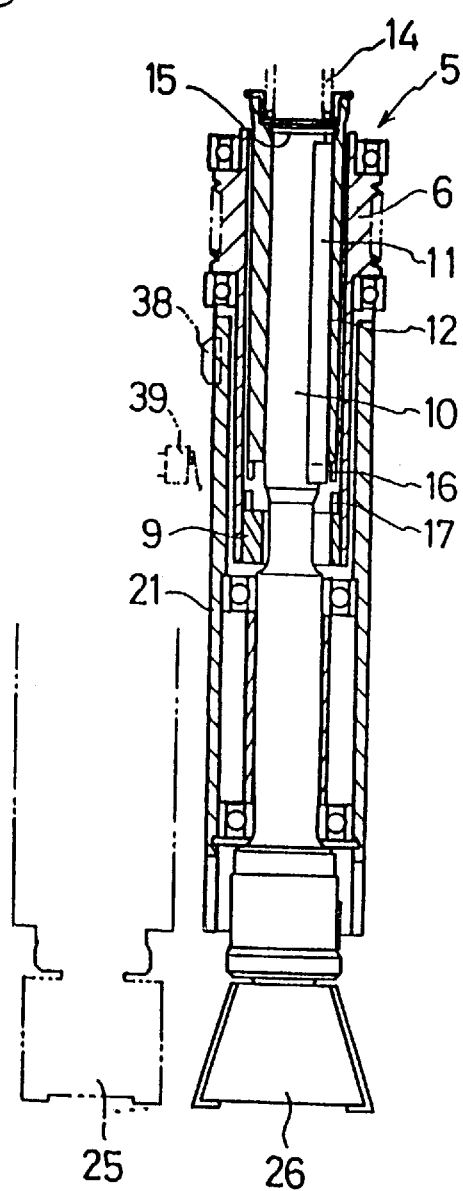
FIG. 7A is a partial cross sectional view of a bit rotation mechanism of the housed joint machine shown in FIG. 1 when the claw clutch is disengaged.
Figure 7B:
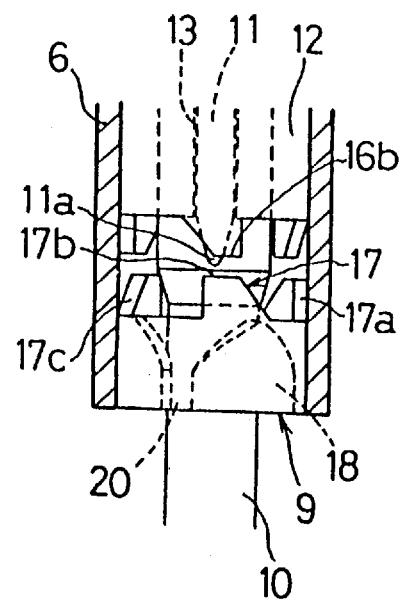
FIG. 7B is an enlarged and detailed partial cross sectional view of the claw clutch being disengaged as shown in FIG. 7A.

The operation of the bit rotation mechanisms 5 of the housed joint machine 1 thus constructed will now be explained with reference to FIGS. 7A to 9B. The right bit rotation mechanism 5 is mainly referred to since the two mechanisms are symmetrical. FIGS. 7B, 8B, and 9B show enlarged, detail views of the claw clutch of the housed joint machine 1 in a series of operational stages.

Reference numeral 38 designates a flip-on lug attached to the outer peripheral wall of the sleeve 21. When being lowered with the sleeve 21, the flip-on lug 38 comes into contact with, and turns on, a limit switch 39 provided inside the housing 4. When turned on, the limit switch 39 outputs a signal to turn on the electromagnet main switch (not shown) of the circuit (not shown) of the motor 2a. The limit switch 39 is turned on by the flip-on lug 38 only when the sleeve 21 is lowered to the position where the vertical faces 16a of the clutch claws 16 are fully engaged with the vertical faces 17a of the mating claws 17. Therefore, when the flip-on lug 38 is in the position shown in FIGS. 7A and 7B, the driven pulley 6 does not rotate even if the drive switch (not shown) of the motor 2 is turned on.

Figure 8A:
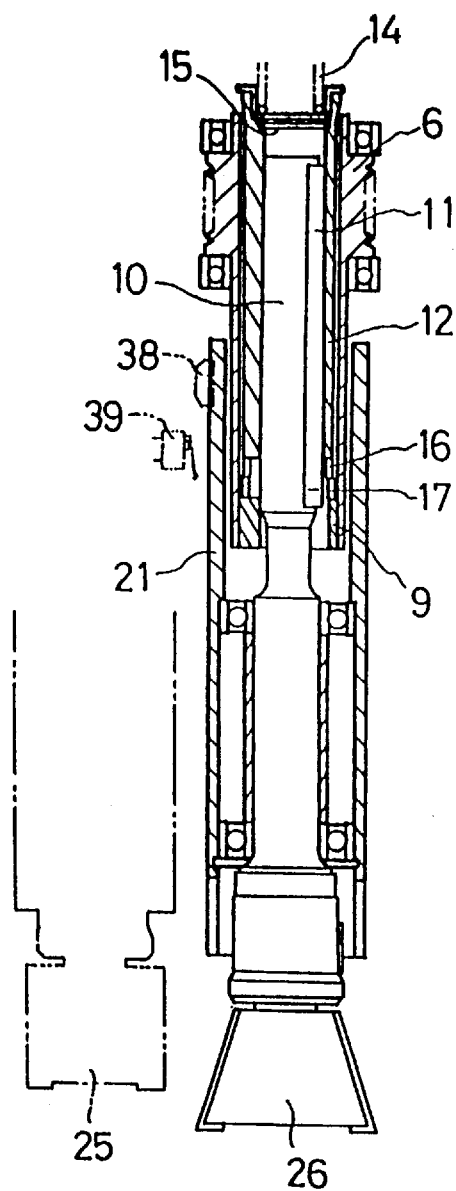
FIG. 8A is a partial cross sectional view of a bit rotation mechanism of the housed joint machine shown in FIG. 1 when the claw clutch is about to be engaged.
Figure 8B:
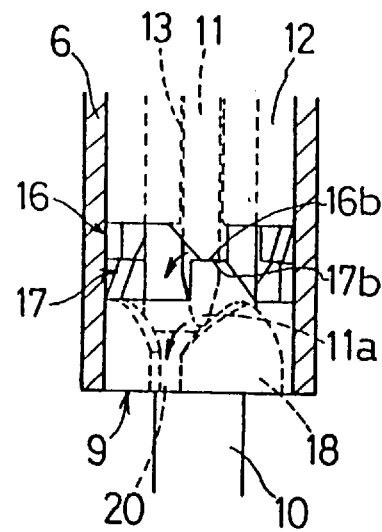
FIG. 8B is an enlarged and detailed partial cross sectional view of the claw clutch about to be engaged as shown in FIG. 8A.
Figure 9A:
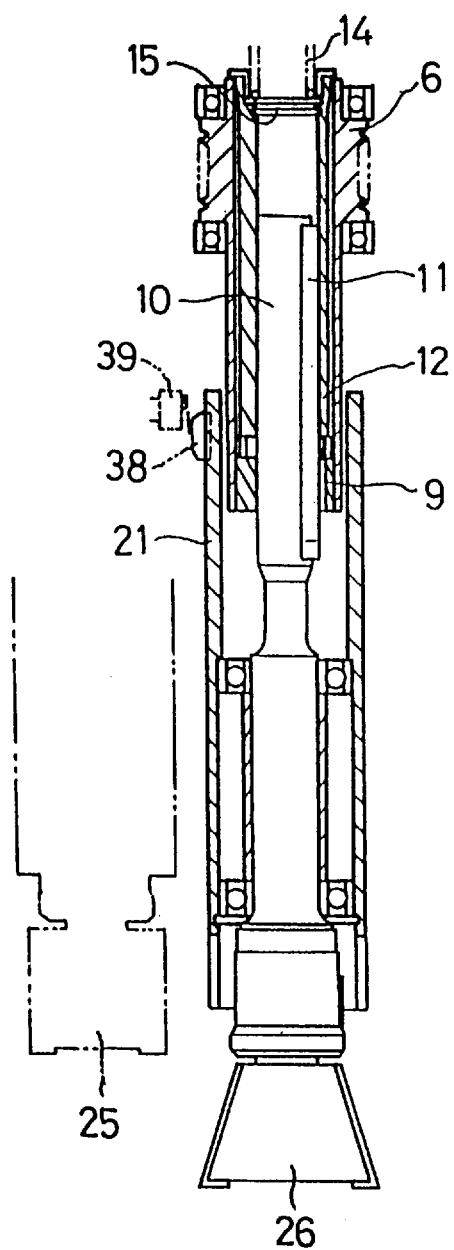
FIG. 9A is a partial cross sectional view of a bit rotation mechanism of the housed joint machine shown in FIG. 1 when the claw clutch is engaged.
Figure 9B:
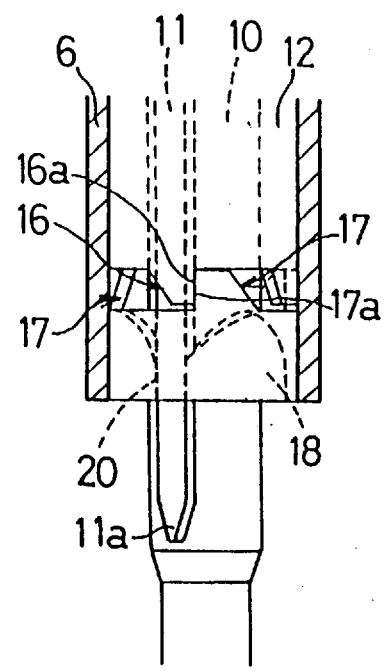
FIG. 9B is an enlarged and detailed partial cross sectional view of the claw clutch being engaged as shown in FIG. 9A.

When the sleeve 21 and the driven shaft 10 are lowered by the lever 29, the cam sleeve 12 is also lowered due to the downward pressure applied by the compression spring 14 as shown in FIGS. 8A and 8B. At this moment, the clutch claws 16 may not necessarily be in a proper position relative to the mating claws 17, i.e., the vertical faces 16a may not be aligned with the vertical faces 17a for smooth clutch engagement. In whatever circumferencial position the clutch claws 16 may be, however, the bottom end 11a of the lowering key 11 is guided by one of the guide portions 18 into one of the slide grooves 20, thereby automatically rotating the driven shaft 10 and the cam sleeve 12 to a proper position where the clutch claws 16 of the cam sleeve 12 engage the mating claws 17 of the clutch cam 9. That is, the moment the key 11 slides into the groove 20, the vertical faces 16a of the clutch claws 16 engage the vertical faces 17a of the mating claws 17 as shown in FIGS. 9A and 9B. This connects the driven pulley 6 with the cam sleeve 12 to enable their integral rotation. Furthermore, since the limit switch 39 has been turned on by the flip-on lug 38 in this position, the main switch is also turned on. As explained above, the motor 2 is now ready to rotate when the motor drive switch is turned on. If the sleeve 21 is further extended to its lowermost position, the driven shaft 10 and the dovetail bit 26 alone are lowered with the key 11 in the key groove 13 while maintaining the engagement of the cam sleeve 12 with the clutch cam 9 in the same vertical position as shown in FIGS. 9A and 9B.

The motor 2, when turned on, rotates the right and left driven pulleys 6. However, since only the right cam sleeve 12 is connected to its corresponding driven pulley 6, the rotation of the right driven pulley 6 is transmitted to the corresponding driven shaft 10 via the clutch cam 12 and the sleeve 12, thus only rotating the dovetail bit 26 and not the straight bit 25. When the motor drive switch is turned off upon completion of the cutting with the dovetail bit 26, the driven pulley 6 and the connected driven shaft 10 is stopped by an electric brake via the belt 7. On the other hand, if the sleeve 21 is raised by operating the lever 29 with the motor drive switch still turned on, the flip-on lug 38 turns off the limit switch 39. Meanwhile, the driven shaft 10, which is simultaneously raised, lifts up the cam sleeve 12 via the C-ring 15, disengaging the cam sleeve 12 from the driven pulley 6. The driven shaft 10, not stopped by the aforementioned electric brake, continues to rotate by its own inertia. If the lever 29 is raised further, the cam sleeve 12 is pressed against the brake shoe 34 via the holder 37, the friction between the cam sleeve 12 and the brake shoe 34 immediately stops the rotation of the cam sleeve 12. Consequently, the rotation of the driven shaft 10, connected to the cam sleeve 12, and the dovetail bit 26 is also stopped. Moreover, as the flip-on lug 38 turns off the limit switch 39 concurrently with the disengagement of the cam sleeve 12 from the clutch cam 9, the electromagnetic main switch is also turned off. Therefore, the motor 2 does not rotate when the limit switch 39 is again turned on as the sleeve 21 is lowered by the lever 29.

According to the foregoing embodiment of the invention, the slide groove 20 and the key 11 of the claw clutch constitute positioning means for correcting the posit ion of the clutch claws 16 relative to that of the mating claws 17 without fail. Thus, the claws 16 and 17 can smoothly engage with each other without clashing or making unpleasant noise while preventing rapid wear.

Various modifications of the claw clutch are possible within the scope of the invention. For example, clutch claws may be directly formed on the driven shaft thereby dispensing with the cam sleeve. Also, the key may be replaced with one or more protrusions for performing a similar function.

Moreover, this claw clutch can be applied to not only housed joint machines but also any other type of machines requiring a claw clutch.

Figure 10A:
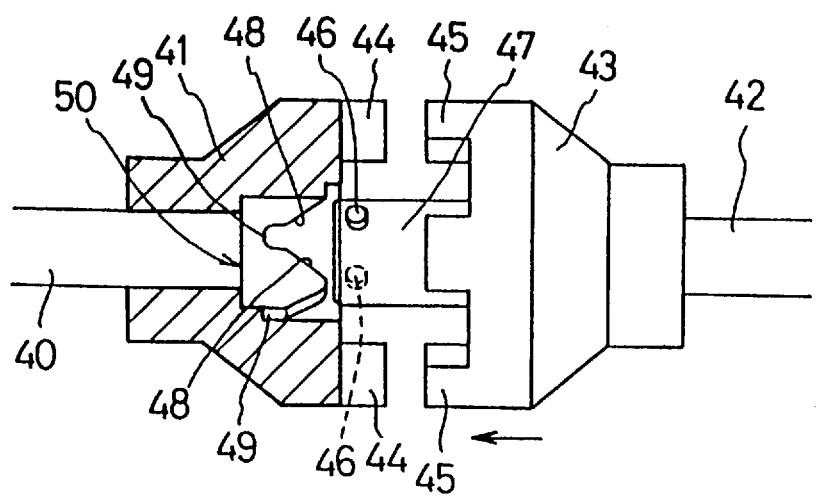
FIG. 10A is a partial cross sectional view of a claw clutch of an alternative embodiment in accordance with the present invention when the claw clutch is disengaged.
Figure 10B:
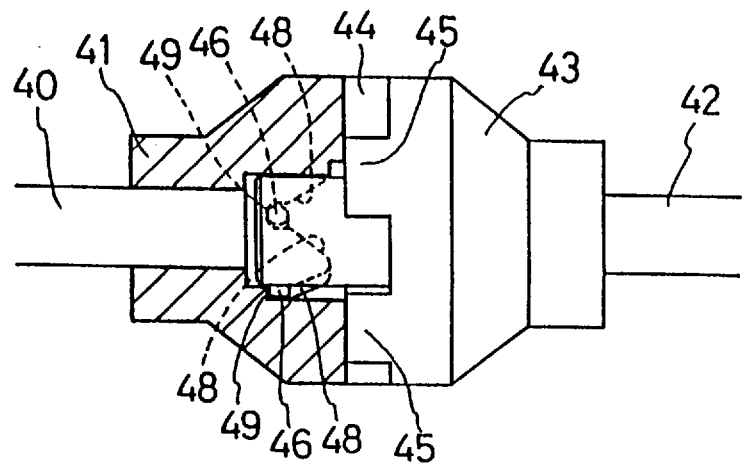
FIG. 10B is a partial cross sectional view of the claw clutch shown in FIG. 10A when the claw clutch is engaged.

FIGS. 10A and 10B show a claw clutch of another embodiment in which a driving shaft 40 and a coaxial driven shaft 42 oppose each other. The two shafts 40 and 42 have on their opposing, coupling ends couplers 41 and 43 with mating claws 44 and 45, respectively. The driven shaft 42 is moved to the driving shaft 41 for clutch engagement in a manner similar to conventional claw clutches. As a distinguishing feature over the conventional clutches, a positioning bar 47 with a plurality of protrusions 46 is attached to the coupler 43 while a bottomed hole 50 with guide slopes 48 and a plurality of retaining recesses 49 is formed in the coupler 41. As shown in FIG. 10B, when the couplers 43 and 41 are connected with each other, the protrusions 46 are guided along the slopes 48 to fit into the recesses 49, thereby properly positioning and engaging the claws 45 with the claws 44.

As there may be many other modifications, alterations, and changes without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A claw clutch for transmitting torque from a driving shaft to a driven shaft coaxial with the driving shaft by moving one of the shafts to the other for clutch engagement, the claw clutch comprising:
   a plurality of first claws formed on one end of the driving shaft;
   a plurality of second claws formed on the end of the driven shaft opposing the first claws of the driving shaft; and
   a positioning means for rotating one of the shafts so as to guide the rotated shaft to a position where the first claws engage with the second claws without clashing when one of the driving or driven shafts is moved to the other shaft for clutch engagement.

2. A claw clutch in accordance with claim 1, wherein the positioning means comprises at least one protrusion formed on one of the driving and driven shafts and at least one recess formed on the other shaft, each of the at least one recess having a pair of guide portions for guiding the at least one protrusion into the at least one recess when one of the driving or driven shafts is moved to the other for clutch engagement.

3. A claw clutch in accordance with claim 2, wherein each of the at least one protrusion is tapered off toward the shaft on which the at least one protrusion is not formed.

4. A claw clutch in accordance with claim 2, wherein each of the guide portions includes a slope extended obliquely to the axial direction of the shafts.

5. A claw clutch for transmitting torque from a driving shaft to a coaxial driven shaft by moving one of the shafts to the other for clutch engagement, the claw clutch comprising:
   a first coupler provided on one end of the driving shaft;
   a second coupler provided on the end of the driven shaft opposing the first coupler formed on the driving shaft;
   a plurality of first claws formed on the first coupler;
   a plurality of second claws formed on the second coupler;
   a coaxial bar provided on one of the two couplers, the coaxial bar having at least one protrusion formed thereon;

a bore formed in the coupler on which the coaxial bar is not provided, for receiving the coaxial bar; and at least one recess formed in the inner peripheral wall of the bore, the at least one recess each including a pair of guide slopes, whereby, when one of the driving or driven shafts is moved to the other for clutch engagement, the at least one protrusion formed on the coaxial bar comes into contact with one of the guide slopes and is rotatably guided to a position where the first claws engage with the second claws without clashing.

6. A claw clutch in accordance with claim 3, wherein each of the guide portions includes a slope extended obliquely to the axial direction of the shafts.

7. A claw clutch for transmitting torque from a driving shaft to a driven shaft disposed coaxial with the driving shaft, by moving one of the shafts relative to the other, the claw clutch comprising a plurality of first claws formed on one end of the driving shaft, a plurality of second claws formed on an end of the driven shaft opposite from the first claws of the driving shaft, and positioning means forming a pair of guide portions on one of the driving shaft and the driven shaft for positioning one of the shafts relative to the other such that the first claws engage with the second claws without clashing, wherein, when one of the shafts is moved relative to the other for clutch engagement, the guide portions independent of the transmitting torque applied to the driving shaft, guide one of the driving shaft and the driven shaft to a position where the first claws engage the second claws to effect said clutch engagement.

8. A claw clutch in accordance with claim 7, wherein the positioning means comprises at least one protrusion formed on one of the driving shaft and the driven shaft and at least one recess formed on the other shaft, each of said recess forming said pair of guide portions for guiding the protrusion into the recess.

9. A claw clutch in accordance with claim 7, wherein each of the guide portions includes a slope extending obliquely to the axial direction of the shaft.

10. A claw clutch for transmitting torque from a driving shaft to a driven shaft disposed coaxial with the driving shaft by moving one of the shafts relative to the other for clutch engagement, the claw clutch comprising a first coupler provided on one end of the driving shaft, said first coupler having a plurality of first claws formed thereon, a second coupler provided on an end of the driven shaft opposite the first coupler formed on the driving shaft, said second coupler having a plurality of second claws formed thereon, a coaxial bar provided on one of the first and second couplers, the coaxial bar having at least one protrusion formed thereon, and means forming a bore in the other coupler which is free of the coaxial bar and sized for receiving the coaxial bar, and means forming at least one recess on an inner peripheral wall of the bore, each recess including a pair of guide slopes for guiding the coupler with the coaxial bar to an engagement position where the first claws engage the second claws, wherein when one of the driving shaft and the driven shaft is moved relative to the other the protrusion on the coaxial bar contacts one of the guide slopes and, independent of the transmitting torque generated by the driving shaft, is non-rotatably guided into said engagement position.

* * * * *